(12) United States Patent
Kasahara et al.

(10) Patent No.: US 6,594,333 B2
(45) Date of Patent: Jul. 15, 2003

(54) THERMAL LOAD REDUCING SYSTEM FOR NUCLEAR REACTOR VESSEL

(75) Inventors: Naoto Kasahara, Oarai-machi (JP); Masanori Ando, Oarai-machi (JP)

(73) Assignee: Japan Nuclear Cycle Development Institute, Ibaraki (JP)

( * ) Notice: Subject to any disclaimer, the term of this patent is extended or adjusted under 35 U.S.C. 154(b) by 0 days.

(21) Appl. No.: 10/115,902

(22) Filed: Apr. 5, 2002

(65) Prior Publication Data
US 2003/0095620 A1 May 22, 2003

(30) Foreign Application Priority Data
Nov. 16, 2001 (JP) ......................... 2001-351310

(51) Int. Cl.⁷ ............................................ G21C 13/032
(52) U.S. Cl. ....................... 376/298; 376/210; 376/221; 376/248; 376/282; 376/290; 376/283; 376/307; 376/299; 376/361; 376/365; 376/366; 376/406; 376/460; 376/461; 376/203; 376/204; 376/205; 376/206; 376/287
(58) Field of Search ................................. 376/210, 221, 376/248, 282, 298, 283, 307, 361, 365, 366, 406, 290, 299, 460, 461, 203, 204, 205, 206, 287

(56) References Cited

U.S. PATENT DOCUMENTS

| | | | | |
|---|---|---|---|---|
| 2,868,708 A | * | 1/1959 | Vernon ..................... 204/193.2 |
| 3,900,366 A | * | 8/1975 | Sakaguchi ................... 376/250 |
| 3,912,584 A | * | 10/1975 | Rubinstein ................... 376/179 |
| 4,464,334 A | * | 8/1984 | Artaud et al. ................ 376/298 |
| 4,608,224 A | * | 8/1986 | Brachet .................. 165/104.28 |
| H000119 H | * | 9/1986 | Keeton et al. ............... 376/299 |
| 4,702,879 A | * | 10/1987 | Tower et al. ................ 376/282 |
| 4,761,261 A | * | 8/1988 | Garabedian .................. 376/285 |
| 4,762,667 A | * | 8/1988 | Sharbaugh ................... 376/298 |
| 4,832,904 A | * | 5/1989 | Thevenin ..................... 376/299 |
| 4,909,981 A | * | 3/1990 | Garabedian .................. 376/290 |
| 5,008,069 A | * | 4/1991 | Fredell ........................ 376/299 |
| 5,087,412 A | * | 2/1992 | Bingham et al. ............ 376/318 |
| 5,112,569 A | * | 5/1992 | Cinotti ........................ 376/282 |
| 5,265,136 A | * | 11/1993 | Yamazaki et al. .......... 376/290 |

FOREIGN PATENT DOCUMENTS

| | | | |
|---|---|---|---|
| DE | 1937627 | * | 2/1971 |
| EP | 0246969 | * | 5/1987 |
| EP | 0362156 | * | 4/1990 |
| FR | 1353703 | * | 2/1963 |
| FR | 1375157 | * | 9/1964 |
| FR | 2437681 | * | 9/1979 |
| GB | 929941 | * | 6/1963 |
| GB | 951896 | * | 3/1964 |
| GB | 1421826 | * | 1/1976 |
| GB | 2163890 | * | 3/1986 |
| WO | WO 91/04559 | * | 4/1991 |

\* cited by examiner

*Primary Examiner*—Michael J. Carone
*Assistant Examiner*—John Richardson
(74) *Attorney, Agent, or Firm*—Armstrong, Westerman & Hattori, LLP

(57) ABSTRACT

The present invention is used to reduce thermal load itself, being the cause to generate stress, which develops near liquid surface in a nuclear reactor wall and to contribute to further improvement of safety. A partition member (5) is arranged above a coolant liquid surface (9) in an annulus space (3) between a reactor vessel (1) and a guard vessel (2), a low-temperature gas is circulated through the annulus space above the partition member to cool down, the gas is circulated through the annulus space from under the coolant liquid surface to the partition member, and the high-temperature gas heated under the coolant liquid surface is used to raise the temperature above the coolant liquid surface.

2 Claims, 6 Drawing Sheets

No temperature control

Active control

FIG.4(a) Distribution in axial direction of stress intensity range Sn

FIG.4(b) Temperature distribution in axial direction

FIG.5(a) Distribution in axial direction of stress intensity range Sn

FIG.5(b) Temperature distribution in axial direction

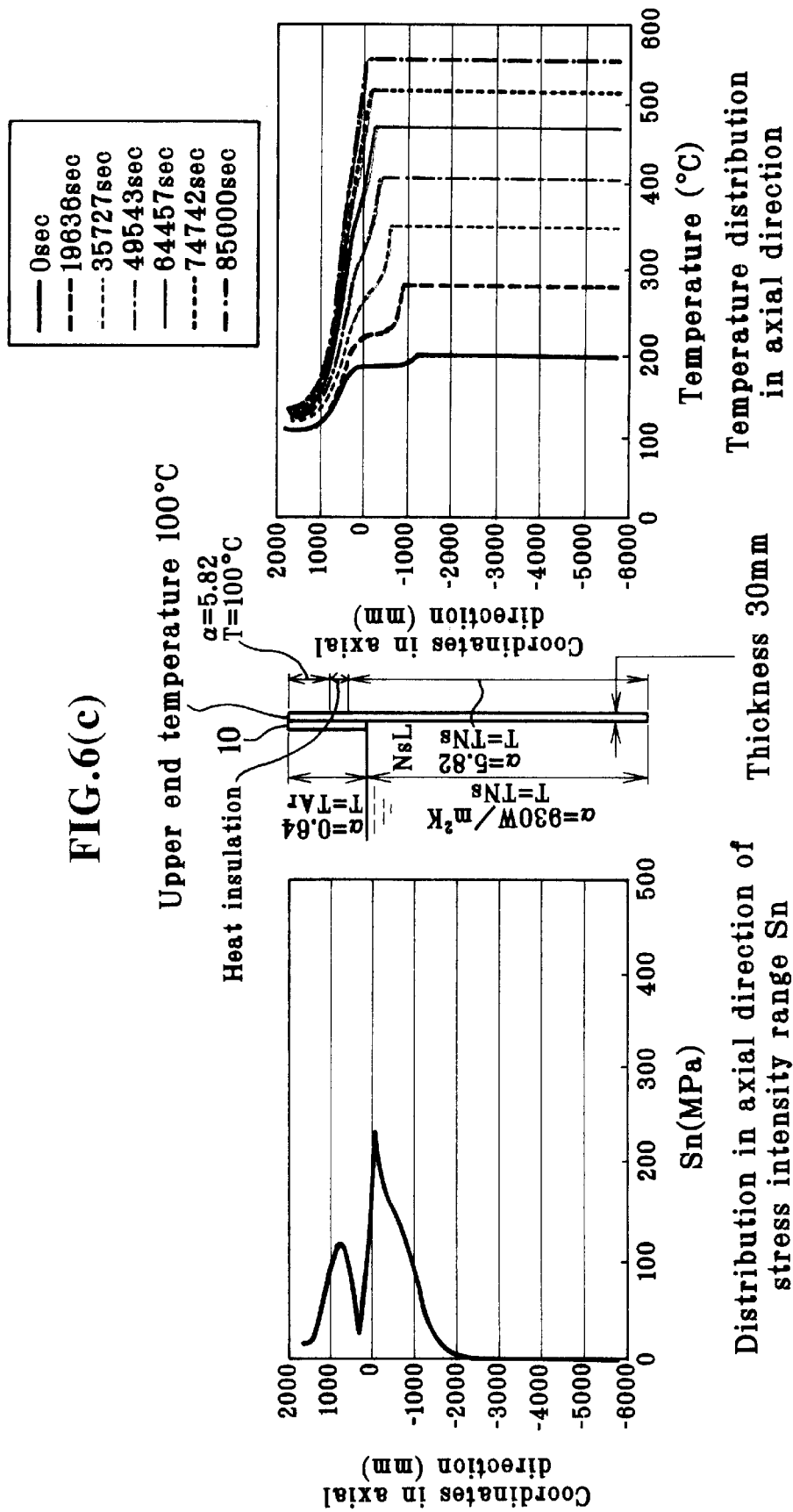

THERMAL LOAD REDUCING SYSTEM FOR NUCLEAR REACTOR VESSEL

BACKGROUND OF THE INVENTION

The present invention relates to a thermal load reducing system for a nuclear reactor vessel to be used for the reduction of thermal load near the liquid surface of a reactor vessel and for the reduction of thermal load near a temperature stratified layer in a reactor vessel.

A reactor vessel in a fast breeder is supported by a concrete wall, an upper end of which must be maintained at the temperature of 100° C. or lower. Because it has a high-temperature coolant at 500° C. or higher in a plenum above reactor core, there occurs a steep temperature gradient in a vertical direction from the coolant liquid surface to the upper support unit. In particular, during starting operation, both temperature and liquid level are increased at the same time, and the gradient becomes steeper. As a result, high thermal stress develops generally near the liquid surface of the reactor wall where the temperature gradient reaches the maximum value.

To cope with this problem, attempts have been made in the past to prevent the increase of the liquid level using a liquid level controller, to evenly cool down the reactor wall using a low temperature sodium circulation system, and to reduce the flexural stress by designing in a thin-wall structure.

As described above, the conventional procedure for reducing thermal load has its principal aims to prevent the increase of liquid level using a liquid level controller, to evenly cool down the reactor wall using a low temperature sodium circulating system, and to decrease flexural stress by designing in thin-wall structure. The liquid level controller and the low temperature sodium circulating system result in higher cost because of the increase of system components. For designing the system in thin-wall structure, there is a limitation because of the possibility of operation failure.

In this respect, according to the present invention, partition plates are provided in an annulus space, and by a simple procedure to heat up the lower half of the gas space and to cool down the upper half of the gas space, and the temperature gradient itself is reduced, which is the cause to generate the stress developing near the liquid surface in the reactor wall. This contributes to further improvement of safety.

SUMMARY OF THE INVENTION

The thermal load reducing system for a reactor vessel according to the present invention is characterized in that partition members are arranged above a liquid surface of a coolant in an annulus space between the reactor vessel and a guard vessel, a low-temperature gas is circulated via the annulus space above the partition members to cool down, and the gas is circulated through the annulus space from under the coolant liquid surface to the partition members, and temperature above the coolant liquid surface is raised by high-temperature gas heated under the coolant liquid surface.

Also, the present invention provides the thermal load reducing system as described above, wherein said low-temperature gas is circulated at a constant flow velocity during operation, and said high-temperature gas is circulated only during starting operation.

BRIEF DESCRIPTION OF THE DRAWINGS

FIG. 6 represent diagrams showing distribution in an axial direction of stress intensity range and distribution in an axial direction of temperature when both active temperature control and passive temperature control are performed.

DETAILED DESCRIPTION OF THE PREFERRED EMBODIMENT

Description will be given below of an embodiment of the present invention.

Figure 1:
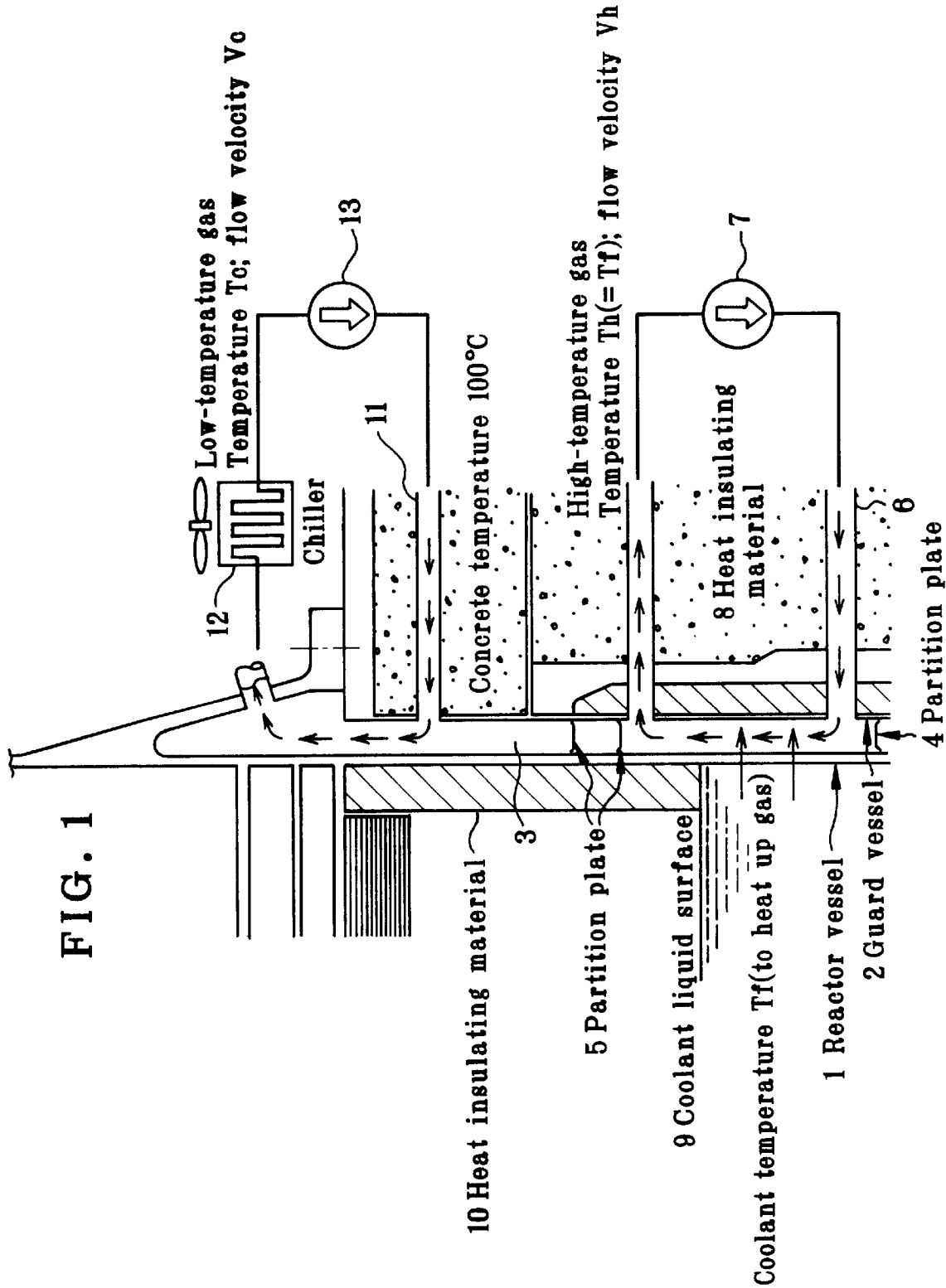
FIG. 1 is a drawing to show an example of a thermal load reducing system according to the present invention to be used for reduction of stress near a liquid surface in a reactor vessel.
Figure 2A:
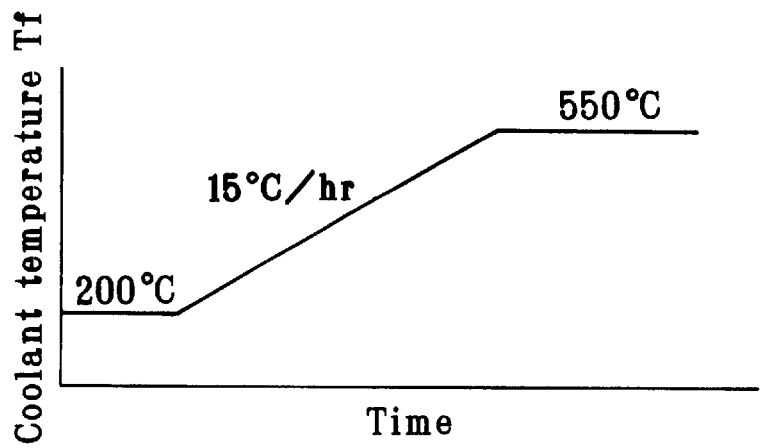
FIGS. 2(a), 2(b) and 2(c) are diagrams to explain a control sequence of the thermal load reduction system.
Figure 2B:
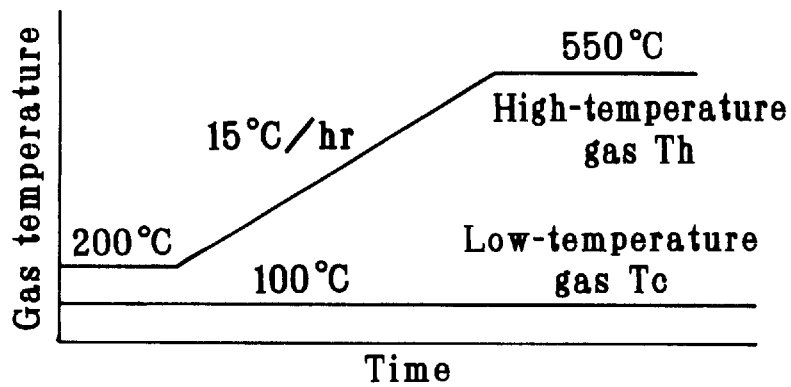
Figure 2C:
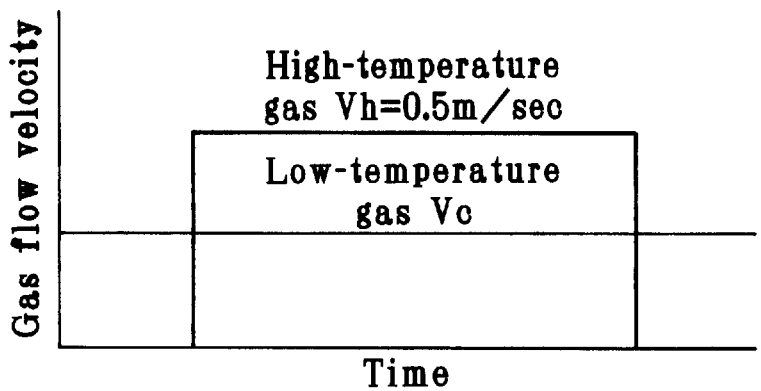
Figure 3A:
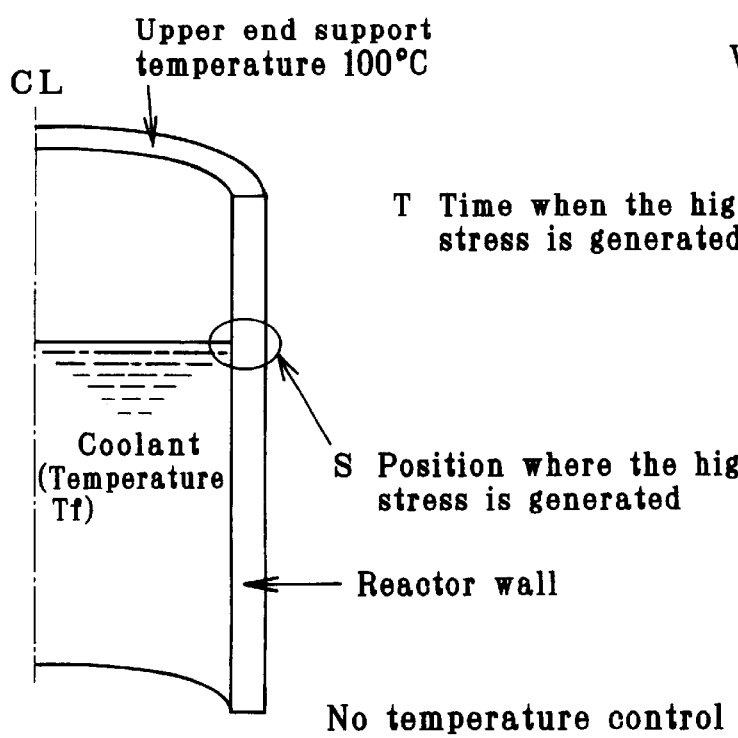
FIGS. 3(a) to 3(d) are drawings to explain the principle of thermal load reduction by active temperature control to reduce stress near a liquid surface of a coolant in a reactor vessel.
Figure 3B:
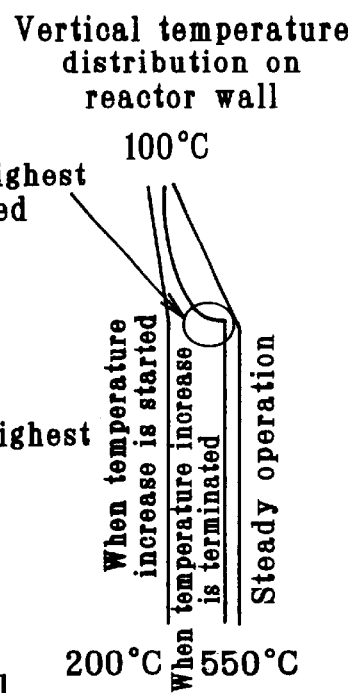
Figure 3C:
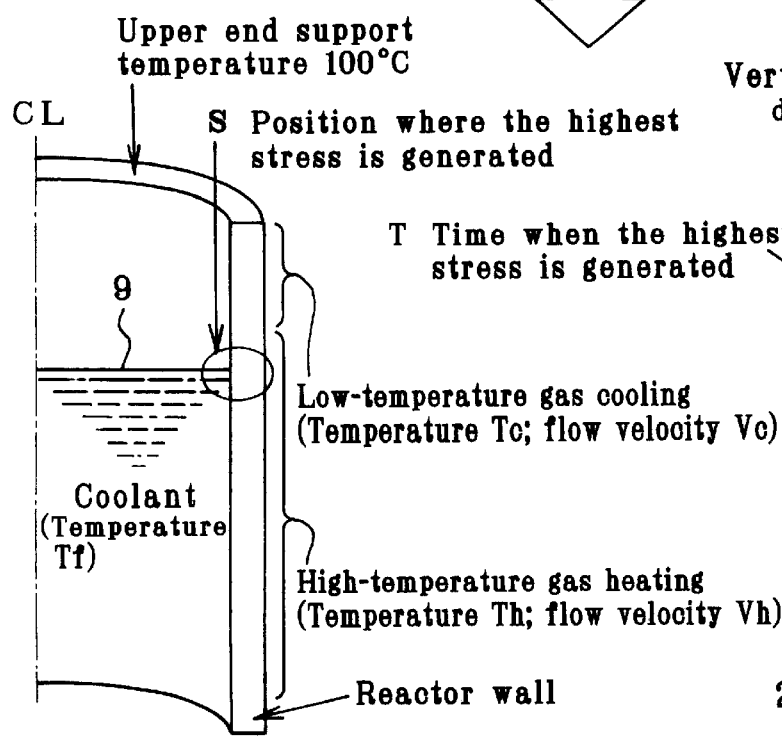
Figure 3D:
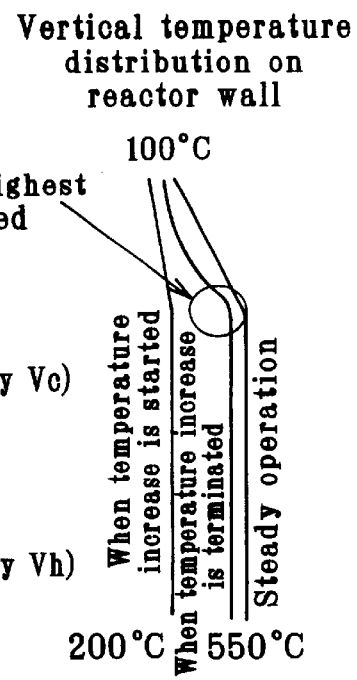

FIG. 1 shows an example of a thermal load reducing system according to the present invention to be used for reduction of stress near the liquid surface in a reactor vessel, and FIGS. 2(a), 2(b) and 2(c) are drawings to explain a control sequence of the thermal load reducing system.

In an annulus space 3 between a reactor vessel 1 and a guard vessel 2, inert gas is filled for the protection of the reactor vessel. A circulating gas passage 6 is formed utilizing the annulus space in the vertical direction between a partition plate 4 provided in the annulus pace at a level beneath a coolant liquid surface 9 and two partition plates 5 and 5 provided in the annulus space at a level above the coolant liquid surface 9. The inert gas is circulated using a pump 7.

The inert gas is heated up by the reactor wall of high temperature under the coolant liquid surface 9. On the other hand, a heat insulating material 10 is provided on the inner wall of the reactor vessel above the coolant liquid surface, and it is thermally insulated from the coolant. As a result, the reactor wall in this portion is at low temperature. Therefore, the inert gas heated by the reactor wall at high temperature heats up the reactor wall at low temperature above the coolant liquid surface while it is circulated, and this alleviates steep temperature gradients near the coolant liquid surface 9. Here, the temperature control to heat up the low-temperature reactor surface by high-temperature gas heated by the high-temperature reactor wall is called "active temperature control". A heat insulating material 8 is provided on the outer wall facing to the annulus space between the partition plates 4 and 5 of the guard vessel so that the temperature of the external concrete structure is not raised.

A circulation gas passage 11 is formed by utilizing the annulus space along the vertical direction on the upper end of the reactor vessel partitioned by the partition plate 5, and a chiller 12 is installed in the circulating gas passage 11. The inert gas at low temperature Tc is circulated via the circulating gas passage 11 using a pump 13, and the upper end portion of the reactor vessel is maintained at 100° C. or lower. Here, the temperature control to cool down the reactor wall by circulating the low-temperature gas Tc is called "passive temperature control".

As shown in FIG. 2(a) and FIG. 2(b), when temperature is increased, the temperature of high-temperature gas Th circulating in the gas passage 6 at a coolant temperature of Tf is raised at a rate of 15° C./hr from 200° C. and it reaches 550° C. The low-temperature gas Tc circulating in the gas passage 11 is maintained at 100° C. Flow velocity of the circulating gas is at a constant level during operation in the case of the low-temperature gas. The high-temperature gas Th is circulated only as the temperature rises during start-up. The flow velocity of the high-temperature gas Th is about twice as high as the flow velocity of the low-temperature gas Tc. In the present example, flow velocity of the high-temperature gas is given by: Vh=0.5 m/sec.

FIG. 3 represents drawings to explain the principle of the thermal load reduction by the active temperature control to reduce the stress near the coolant liquid surface in the reactor vessel. FIG. 3 (a) shows the case where there is no temperature control, and FIG. 3 (b) shows the case where the active temperature control is performed.

As described above, the reactor vessel in a fast breeder is supported by concrete, and the upper end must be kept at the temperature of 100° or lower. During the starting operation, the temperature of the coolant is increased from 200° C. to 550° C. By local temperature gradient in the vertical direction developed during this process, high thermal stress is generated on the reactor wall. Specifically, in case temperature distribution during the starting of the reactor vessel is left freely as it goes (FIG. 3 (a)), the highest stress is generated on the outer surface of the reactor wall (the point S in FIG. 3 (a)) near the liquid surface when a temperature increase is terminated. This stress is cased by the steep temperature gradient (temperature gradient at the time T in FIG. 3 (a)) when the temperature increase is terminated between a liquid contact portion in contact with the high-temperature coolant and the gas space at low temperature. To alleviate this stress, the low-temperature reactor wall above the liquid surface is heated during temperature increase, and this makes it possible to reduce the temperature gradient in the vertical direction, which causes the stress.

On the other hand, temperature near the upper end of the reactor wall is decreased so that the temperature at the upper end supported by the concrete wall may not be raised by the heating of the reactor wall. As a result, it is found that the temperature gradient at the point S, i.e. the point where the highest stress is generated, is smoothened and flattened at the time T when the highest stress is generated. As described above, by the simple procedure to install the partition plates in the annulus space, to heat up the lower half of the gas space, and to cool down the upper half of the gas space, it is possible to reduce the stress.

Table 1 summarizes the results of a comparison between the stress intensity range Sn and the allowable value when only the passive temperature control is performed and when both the active temperature control and the passive temperature control are performed. The stress intensity range serves as an index for development of crack and deformation as evaluated from stress distribution obtained with numerical analysis.

TABLE 1

|  | No temperature control | Passive temperature control | Active temperature control |
|---|---|---|---|
| The highest Sn | 406 MPa | 372 MPa | 225 MPa |
| Allowable value | 400 MPa | 400 MPa | 400 MPa |

However, the passive temperature control in Table 1 is simultaneously performed with the active temperature control. From Table 1, it has been confirmed that the stress near the liquid surface in the reactor vessel is amply below the allowable value when the active temperature control is performed.

Next, description will be given on temperature and stress distribution in the vertical direction of the reactor wall along the outer surface at the time when the highest stress is generated during the starting operation of the reactor in the following three cases: the case where no temperature control is performed, the case where only the passive temperature control is performed, and the case where both the active temperature control and the passive temperature control are performed.

Figure 4C:
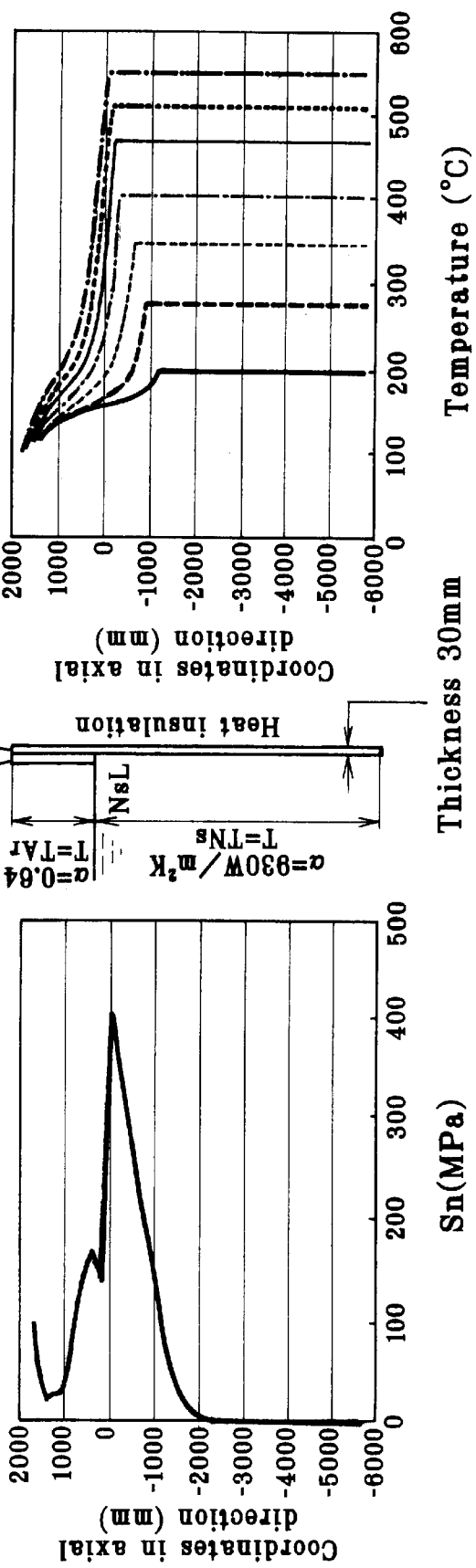
FIG. 4 represents diagrams showing distribution in an axial direction of stress intensity range and distribution in an axial direction of temperature when no temperature control is performed.
Figure 5C:
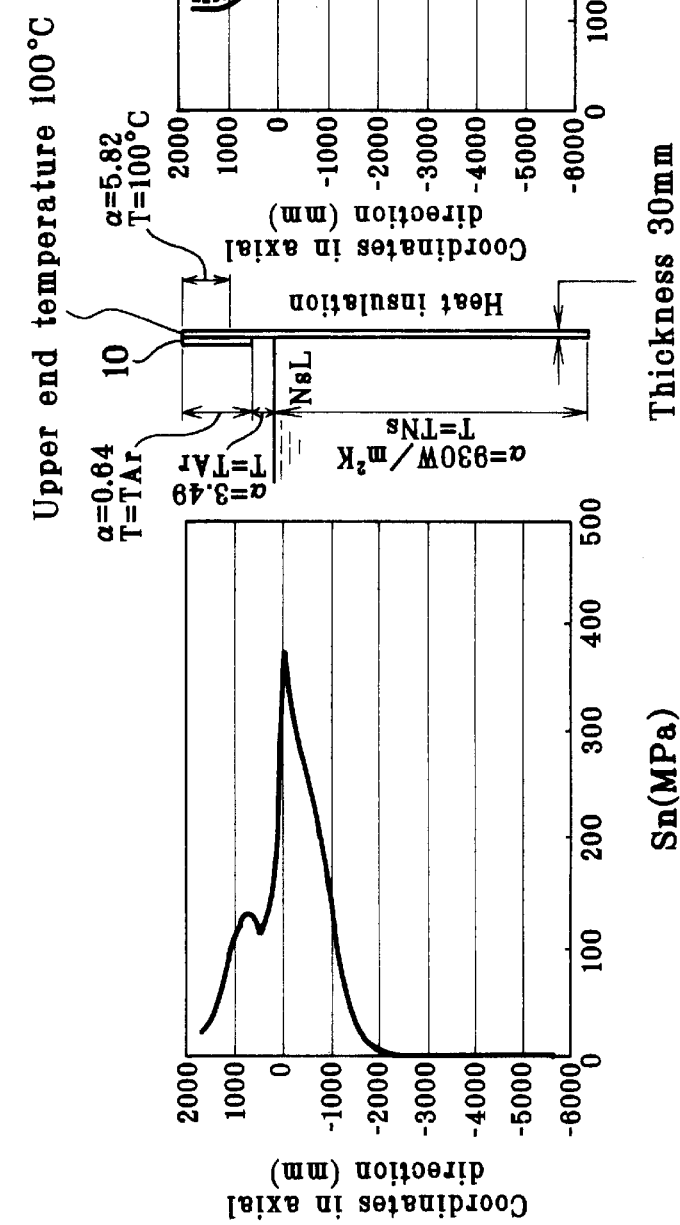
FIG. 5 represents diagrams showing distribution in an axial direction of stress intensity range and distribution in an axial direction of temperature when only passive temperature control is performed.

FIG. 4 shows the data in the case where no temperature control is performed, FIG. 5 shows the data in the case where only the passive temperature control is performed, and FIG. 6 shows the data in the case where both the active temperature control and the passive temperature control are performed. Distribution in an axial direction of the stress intensity range is shown in FIG. 4 (a), FIG. 5 (a) and FIG. 6 (a). Distribution in an axial direction of temperature in each case (changes with respect to time) is shown in FIG. 4 (b), FIG. 5 (b) and FIG. 6(b) respectively. In these drawing figures it should be understood that T represents "temperature"; TNs represents "temperature of sodium"; TAr represents "temperature of argon gas; and NsL represents "liquid surface level of sodium". Further, in the figures, reference numeral 10 denotes a heat insulating material. In the cases shown in FIG. 4 and FIG. 6, it is installed on the inner surface of the reactor wall in the gas space above the coolant liquid surface. In the case shown in FIG. 5, it is provided on the inner surface of the reactor wall except the portion immediately above the coolant liquid surface. Heat transfer coefficient a between gas or sodium and the reactor wall (thickness: 30 mm) is 903 W/m$^2$K (where W is a value in watt, and K is absolute temperature) at the portion in contact with the coolant. It is 0.64 W/m$^2$K at the portion where no heat insulating material is provided, and 5.82 W/m$^2$K on the portion of the coolant. The symbol NsL represents a position on the coolant liquid surface.

Compared with the case where only the passive temperature control is performed (FIG. 5) and the case where no temperature control is performed (FIG. 4), the temperature near the upper end of the reactor is decreased and stress intensity at the upper end portion is decreased. In contrast, in the case where both the active temperature control and the passive temperature control are performed (FIG. 6), it is evident that the stress near the coolant liquid surface is extensively decreased, and thermal stress is alleviated.

As described above, according to the present invention, an annulus space between the reactor vessel and the guard vessel is used as a passage. By the simple and non-contact method to heat up the lower half of the gas space by gas circulation, and to cool down the upper half of the gas space, it is possible to reduce the stress near the liquid surface in reactor vessel without increasing the quantity of the materials used. The mode of damage probably caused by thermal stress near the liquid surface in the reactor vessel is creep fatigue and ratchet deformation, which are related to the number of applications, and there is no problem even when the influence of relatively less frequent power suspension or operation failure is neglected.

What is claimed is:

1. A nuclear reactor including:
   a nuclear reactor vessel containing a body of coolant liquid defining a coolant liquid surface therein, a guard vessel spaced from said nuclear reactor vessel to form an annulus space therebetween, and a thermal load reducing system for controlling thermal stresses in said nuclear reactor vessel comprising:

partition members disposed in said annulus space at a position above the surface of the coolant liquid body in said reactor vessel, means for circulating a low temperature gas via the annulus space and above the partition members to cool down the adjacent reactor vessel wall disposed above said coolant liquid surface, and means for circulating a higher temperature gas via the annulus space from a level lower than the surface of the coolant liquid body to the partition members for raising the temperature of the reactor vessel wall disposed below the surface of the coolant liquid body within the reactor vessel.

2. The thermal load reducing system in a nuclear reactor vessel according to claim 1, wherein said low-temperature gas is circulated at a constant flow velocity during normal operation of said nuclear reactor, and said high-temperature gas is circulated only during starting operation of said nuclear reactor.

\* \* \* \* \*